United States Patent
Smetz

(10) Patent No.: US 6,568,165 B2
(45) Date of Patent: May 27, 2003

(54) COMPONENT WHICH CAN BE USED IN CONJUNCTION WITH LINK CHAINS

(75) Inventor: Reinhard Smetz, Baldingen (DE)

(73) Assignee: Rud-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/944,628

(22) Filed: Aug. 31, 2001

(65) Prior Publication Data

US 2002/0112463 A1 Aug. 22, 2002

(30) Foreign Application Priority Data

Sep. 4, 2000 (DE) ..................... 200 15 556 U

(51) Int. Cl.[7] ............................................. F16G 17/00

(52) U.S. Cl. .................. 59/93; 24/116 R; 294/82.1

(58) Field of Search ............... 59/93; 294/82.11, 294/82.1, 82.2; 24/116 R

(56) References Cited

U.S. PATENT DOCUMENTS

| | | | | |
|---|---|---|---|---|
| 3,601,978 A | * | 8/1971 | Rieger | 294/82.1 |
| 3,777,477 A | * | 12/1973 | Biondo | 59/93 |
| 3,863,441 A | * | 2/1975 | Kaufmann | 294/82.1 |
| 3,901,024 A | * | 8/1975 | Ratcliff | 59/93 |
| 4,151,708 A | * | 5/1979 | Smetz | 24/116 R |
| 4,398,387 A | * | 8/1983 | Bary | 59/93 |
| 5,309,706 A | * | 5/1994 | Lasaroff et al. | 59/93 |
| 5,724,804 A | * | 3/1998 | Smetz | 24/116 R |
| 5,829,810 A | * | 11/1998 | Fredriksson | 59/93 |

\* cited by examiner

*Primary Examiner*—David Jones
(74) *Attorney, Agent, or Firm*—Mark P. Stone

(57) ABSTRACT

In the case of a component which can be used in conjunction with round steel chains and has two crossover slots (6, 7) which form a pull-through or insertion opening for the chains, the pull-through or insertion opening is blocked, following the introduction of a chain link into that part of the longer slot (6) which forms an extension (8) bounded by supporting zones (9, 10), by a securing element (14) in the region of that end of the longer slot (6) which is directed away from the extension (8).

22 Claims, 4 Drawing Sheets

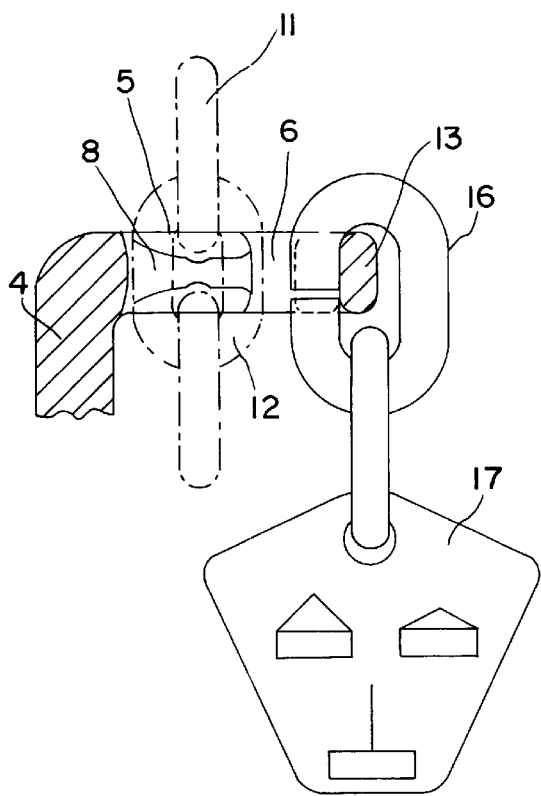
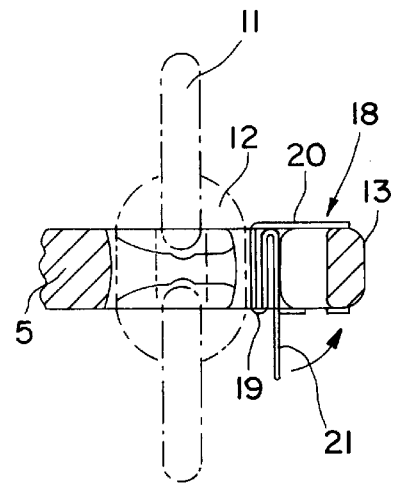
FIG. 4
FIG. 5
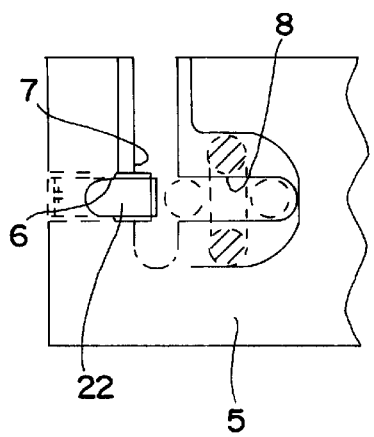
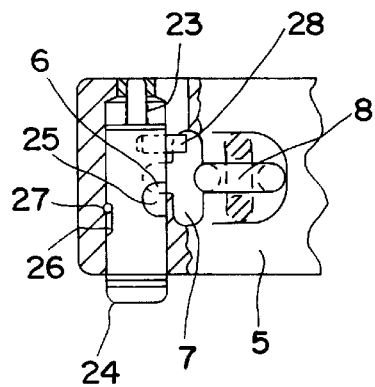
FIG. 6
FIG. 7

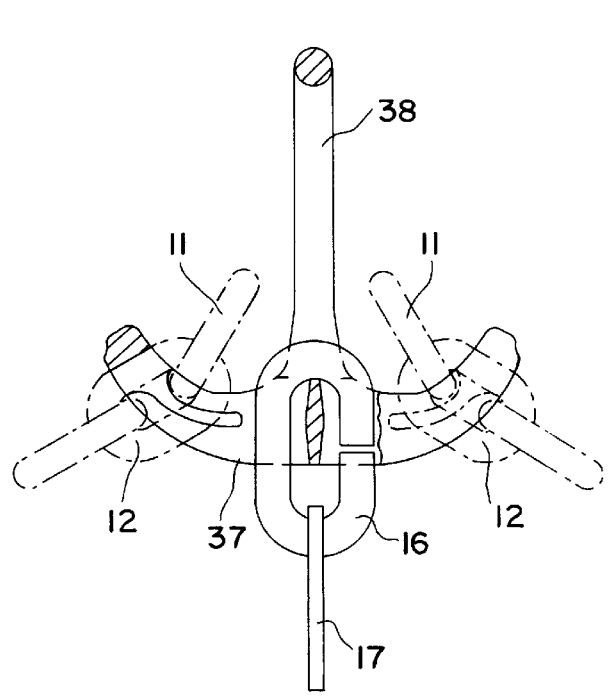
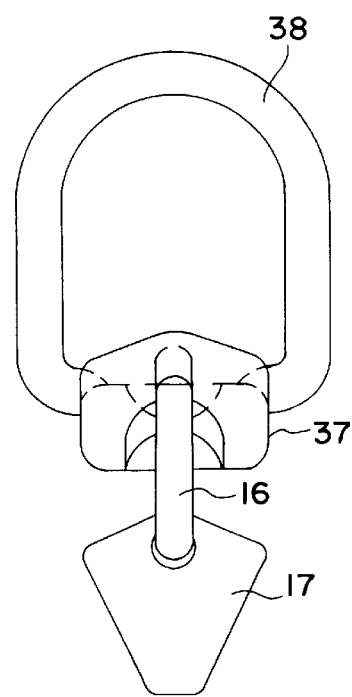
FIG. 11              FIG. 12
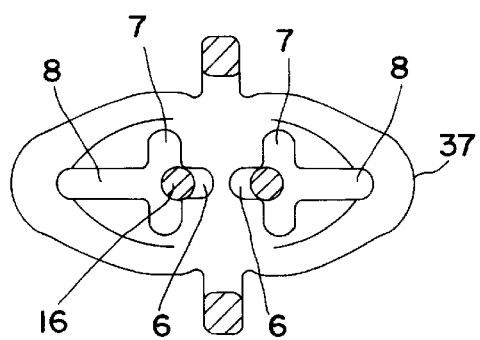
FIG. 13

COMPONENT WHICH CAN BE USED IN CONJUNCTION WITH LINK CHAINS

BACKGROUND OF THE INVENTION

The invention relates to a component which can be used in conjunction with a link chain, in particular round steel chain, and has a basic body which has at least two crossover slots which form a pull-through or insertion opening for the chain and of which one is provided with an extension which projects between two supporting zones which are provided on the component and are intended for the front end of a chain link which serves for transmitting force between the component and the chain and is connected to the chain link which is introduced into the extension, the latter chain link being secured by a securing element against displacement from the extension into the crossover region of the slots.

EP 0 736 150 B1 discloses a component of the above-mentioned type which is designed as a shortening claw and in the case of which the securing element bridges the longer of the two cross-slot-forming slots at a location which is located between the crossover region of the slots and the chain link which is introduced into the extension. This securing method thus corresponds to the principle by which a part which can be moved back and forth between two positions is prevented from returning into a starting position in that a barrier is provided between the two positions.

SUMMARY OF THE INVENTION

As can be gathered by way of the known design, the known securing principle requires the differences in length between the two slots of the cross slot to be comparatively large. If one takes into consideration that slots weaken a component, with predetermined dimensions, in the slot region in each case, then it proves tb be expedient to keep the slot dimensions as small as possible. This aim is the object on which the invention is based. This object is achieved according to the invention, in contrast to common practice, in that, in the case of a component of the type in question, the slot of the crossover slots which has the extension is blocked by the securing element in the region of its end which is directed away from the extension.

In other words, rather than forming a barrier, the securing element in the case of the solution according to the invention forms an end stop which performs the function of the barrier. The proposed position of the securing element makes it possible to reduce the distance between the supporting zones and the center of the cross slot and thus to increase the compactness and rigidity of the respective component.

BRIEF DESCRIPTION OF THE DRAWINGS

Further features and details of the invention can be gathered from the subclaims and from the following description of a number of exemplary embodiments illustrated in the attached drawing, in which:

FIG. 4 shows a first modified securing element for the shortening claw according to FIG. 1;

FIG. 5 shows a second modified securing element for the shortening claw according to FIG. 1;

FIG. 6 shows a plan view of that end of another component which has an open cross slot;

FIG. 7 shows a plan view of that end of a further component which has a cross slot;

FIG. 11 shows, partly in section, the side view of a component for a double-strand suspension means;

FIG. 12 shows the side view of the component according to FIG. 11; and

FIG. 13 shows, partly in section, the plan view of the slots of the component according to FIG. 11.

DESCRIPTION OF THE BEST MODES OF THE INVENTION

Figure 1:
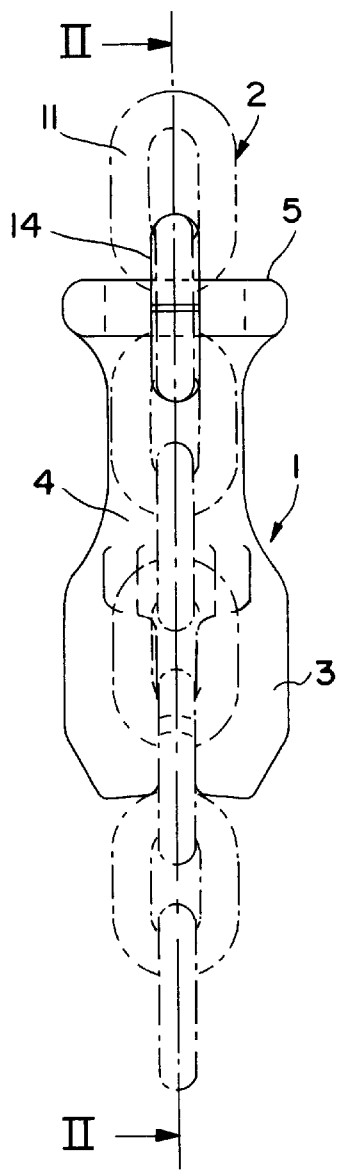
FIG. 1 shows the front view of a component designed as a shortening claw.
Figure 2:
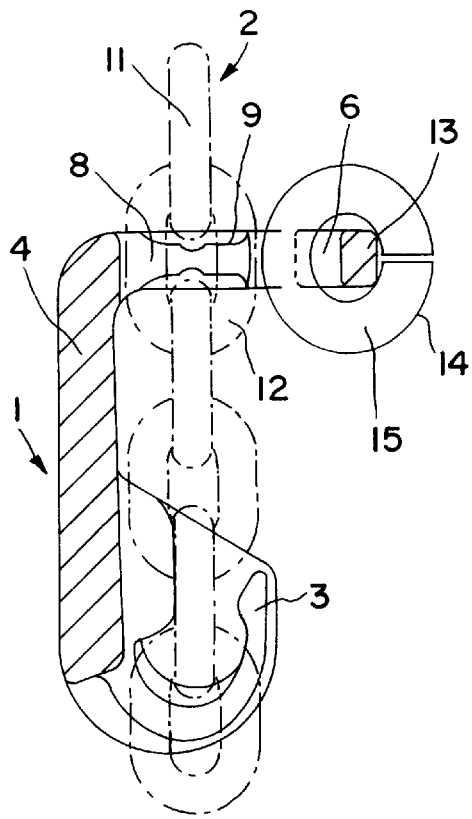
FIG. 2 shows a section along line II—II in FIG. 1.
Figure 3:
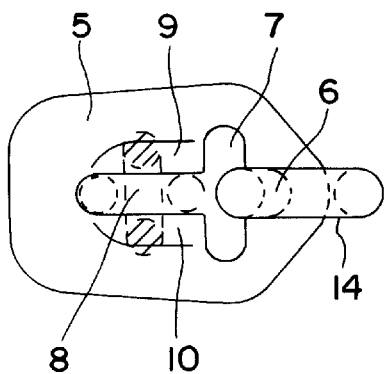
FIG. 3 shows a plan view of the top end, having a cross slot, of the shortening claw according to FIG. 1.

In FIGS. 1 to 3, 1 is the basic body of a component which serves for shortening a chain 2. The basic body 1 has, at its bottom end, a claw 3 into which in each case one link of the chain 2, comprising oval round steel links, can be fitted. An angled end 5 of the basic body 1 is connected to the claw 3 via a spine 4. Located in the angled end 5 are two crossover slots 6 and 7, of which one is provided with an extension 8. The crossover slots 6 and 7 form a pull-through opening for the chain 2 in their crossover region, which is directed away from the spine 4. As illustrated by FIG. 3, crossover slots 6, 7 are oriented essentially perpendicular to each other.

In the region of the extension 8, on the top side of the angled end, two supporting zones 9 and 10 are provided for the front end of the link 11 of the chain 2. In order to prevent the link 12 of the chain 2, said link 12 being connected to the link 11, from sliding back into the crossover region of the slots 6, 7, that end of the slot 6 which is directed away from the extension 8 is blocked by a securing element 14, which encloses a crosspiece-like section 13 of the end 5 of the basic body 1. In the case of FIGS. 1 to 3, the securing element comprises a section of wire 15 which is bent to form an open circular ring. Instead of the securing element 14, it is also possible to use a securing element 16 which is formed by an open oval chain link and can be used, in addition, for fastening a so-called identification tag 17. A further possible securing means is shown in FIG. 5, in which the securing element 18 is formed by a sheet-metal strip, of which the ends 20, 21, which are connected to one another via a yoke 19 which has been folded a number of times, butt, in the secured position, against the mutually opposite sides of the crosspiece-like section 13 of the basic body 1.

As in the previously described cases, it is also the case in the solution variants illustrated in FIGS. 6 and 7 that the slots 6, 7 of the component are arranged essentially perpendicularly to the pulling direction of the chain 2 introduced and in the immediate vicinity of a supporting means corresponding to the spine 4 of the basic body 1 according to FIGS. 1 to 3. The proximity of the cross slot to the respective supporting means has a favorable effect here on the loading to which the component is subjected by bending moments.

In the case of the embodiment according to FIG. 6, a securing element 22 formed by a screw serves for securing the chain link 12 in the extension 8 of the slot 6, said securing element 22 simultaneously closing the slot 7, which in this case is open.

FIG. 7 shows a further solution, which is recommended in the cases in which frequently different links of the chain 2 are utilized for connection to a component. However, the easier handling of this solution is achieved at the expense of increased outlay. The securing element 24, which is formed by a bolt which can be displaced back and forth counter to the action of a spring 23, has a transverse groove 25 which, overcoming the force of the spring 23, can be transferred into a position in which it releases the slot 6 of the crossover slots 6, 7 which has the extension 8. The displacement path of the bolt is limited by a clamping sleeve 27 engaging in a groove 26. The clamping sleeve 27 and a protrusion 28, which is arranged on the bolt and is formed by a pin, prevent rotation of the securing element 24 about its longitudinal axis.

Figure 8:
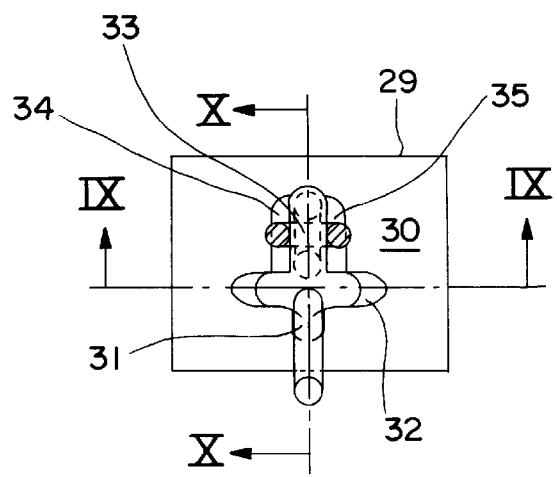
FIG. 8 shows a plan view of a component which is designed as a point of attachment for an attachment chain.
Figure 9:
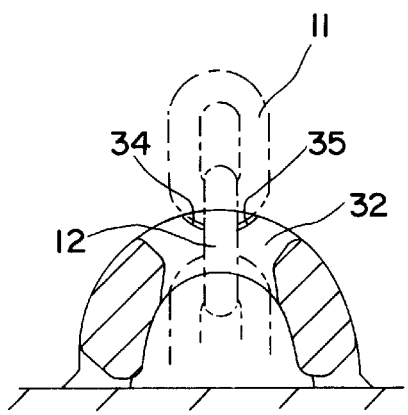
FIG. 9 shows a section along line IX—IX in FIG. 8.
Figure 10:
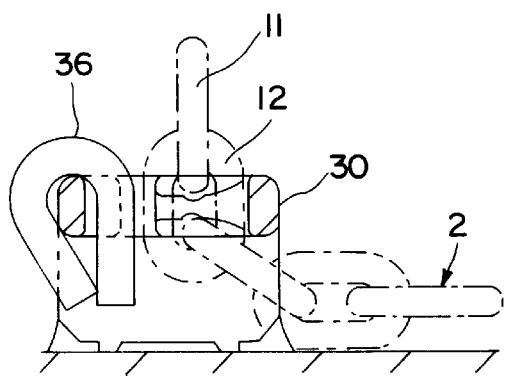
FIG. 10 shows a section along line X—X in FIG. 8.

FIGS. 8 to 10 show a so-called point of attachment as is used, for example, on machine frameworks and containers. The basic body 29 in this case comprises a U-shaped bracket which, in the region of its yoke 30, is provided with the cross slot, which is formed by two slots 31, 32. The slot 31 projects, by way of its extension 33, in turn between two supporting zones 34, 35 for a link 11 of a chain 2. In order to secure the position of the chain link 12 in the extension 33 of the slot 31, use is made here, as in the case of FIGS. 1 to 4, of a securing element 36, which is bent from a section of wire.

FIGS. 11 to 13, finally, illustrate a component which is used in conjunction with double-strand suspension means. The basic body 37 of this component is of essentially T-shaped design. Two pairs of crossover slots 6 and 7 are arranged in the crossbar of the T, said crossbar forming a type of yoke. It is also the case here that the chain links 12 introduced into the extensions 8 of the slots 6 are secured by a securing element 16, designed as an oval link, against displacement into the crossover region of the slots 6, 7. That part of the basic body 37 which corresponds to the longitudinal bar of the T forms an eyelet-like suspension head 38 for a crane hook 17 (not illustrated). As in the case of FIG. 4, 17 is an identification tag.

What is claimed is:

1. A component for use with a link chain, said component comprising a basic body (1) having at least two crossover slots (6, 7) forming an insertion opening for said link chain, one said crossover slot (6) having an extension (8) which projects between two supporting zones (9, 10) on said component, said supporting zones adapted to engage a front end of a first chain link (11) which is connected to a second chain link (12) received in said extension for transmitting force between said component and said link chain, and a securing element (14) for said second chain link (12) for preventing displacement of said second chain link from said extension (8) into the crossover region of said slots (6, 7), said one slot (6) having said extension being blocked by said securing element in the region of an end of said one slot which is directed away from said extension.

2. The component as claimed in claim 1, wherein said at least two crossover slots (6, 7) cross over in a region of one end of said basic body (1) which is offset from the center of said basic body, and said extension (8) of said one slot (6) is directed towards the center of the basic body (1).

3. The component as claimed in claim 2, wherein said basic body (1) has an angled end, and the supporting zones (9, 10) for said first chain link (11) for transmitting force between said component and said link chain are arranged on said angled end of said basic body (1).

4. The component as claimed in claim 2, wherein the crossover slots (6, 7; 31, 32) are arranged essentially perpendicularly to the pulling direction of the chain (2).

5. The component as claimed in claim 1, wherein said basic body (1) has an angled end, and the supporting zones (9, 10) for said first chain link (11) for transmitting force between said component and said link chain are arranged on said angled end of said basic body (1).

6. The component as claimed in claim 1, wherein the crossover slots (6, 7; 31, 32) are arranged essentially perpendicularly to the pulling direction of the chain (2).

7. The component as claimed in claim 1, wherein the securing element (14; 16; 36) is formed by a section of wire which encloses a crosspiece-like section (13) of the basic body (1), passes through the crossover slots (6, 7) and is bent together at its ends.

8. The component as claimed in claim 7, wherein the securing element (14) is a ring link.

9. The component as claimed in claim 7, wherein the securing element (16) is an oval link.

10. The component as claimed in claim 9, wherein an identification tag (17) is connected to the oval link.

11. The component as claimed in claim 1, wherein the securing element (18) is formed by a sheet-metal strip, of which the ends (20, 21), which are connected to one another by a yoke (19) arranged in one of the crossover slots (6, 7), enclose a section (13) of the basic body (1) in a fork-like manner.

12. The component as claimed in claim 1, wherein the securing element (22) is formed by a screw which is screwed into that end of the slot (6), having the extension (8), which is directed away from the extension (8).

13. The component as claimed in claim 1, wherein the securing element (24) is formed by a bolt which can be displaced, counter to the action of a spring (23), perpendicularly to the slot (6), having the extension (8), and is provided with a transverse groove (25) which, overcoming the spring force, can be transferred into a position in which the bolt releases the crossover slots (6, 7).

14. The component as claimed in claim 13, wherein the bolt is provided with at least one protrusion (28) which, in the securing position of the bolt, projects into the slot (7) of the crossover slots (6, 7) which is arranged parallel to the bolt.

15. The component as claimed in claim 14, wherein the protrusion (28) comprises means for preventing rotation of the bolt.

16. The component as claimed in claim 1, wherein said basic body (29) is formed by an essentially U-shaped bracket having a yoke (30), said crossover slots (31, 32) being arranged in said yoke of said essentially U-shaped bracket.

17. The component as claimed in claim 1, wherein said two crossover slots (6, 7) are oriented perpendicularly to each other, and said slot (7) not having said extension (8) is opened at one of its two ends.

18. The component as claimed in claim 17, wherein said securing element (14) at least partially closes said slot (7) not having said extension (8).

19. The component as claimed in claim 1, wherein said basic body (37) is essentially T-shaped.

20. The component as claimed in claim 19, wherein that part of the basic body (37) which corresponds to the crossbar of the T is provided with two pairs of crossover slots (6, 7), while that part of the basic body (37) which corresponds to the longitudinal bar of the T forms an eyelet-like suspension head (38).

21. The component as claimed in claim 20, said component comprising a joint securing element (16) for said two pairs of crossover slots (6, 7).

22. The component as claimed in claim 1, wherein said two crossover slots (6, 7) are oriented substantially perpendicularly to each other.

* * * * *